United States Patent [19]

Bernard et al.

[11] Patent Number: 5,554,270
[45] Date of Patent: Sep. 10, 1996

[54] ELECTROLYTIC DESILVERING METHOD

[75] Inventors: Patrick E. Y. Bernard, Bellecroix; Claude R. Bertorelli, Dracy le Fort; Alain C. S. Marchand, Jaux, all of France

[73] Assignee: Eastman Kodak Company, Rochester, N.Y.

[21] Appl. No.: 157,352
[22] PCT Filed: May 11, 1992
[86] PCT No.: PCT/FR92/00418
 § 371 Date: Nov. 12, 1993
 § 102(e) Date: Nov. 12, 1993
[87] PCT Pub. No.: WO92/20838
 PCT Pub. Date: Nov. 26, 1992

[30] Foreign Application Priority Data

May 14, 1991 [FR] France .................................. 91 05984

[51] Int. Cl.$^6$ ....................................................... C25C 1/20
[52] U.S. Cl. .......................... 205/494; 205/566; 205/571
[58] Field of Search ........................... 204/109; 205/348, 205/494, 566, 571

[56] References Cited

U.S. PATENT DOCUMENTS 4,111,766  9/1978  Idota et al. .............................. 204/109
4,128,464  12/1978  Idota ...................................... 204/151

OTHER PUBLICATIONS

*Patent Abstracts of Japan*, vol. 12, No. 172, (C–497) (3019) 21 May 1988 & JP, A, 62 278 289 (Konishiroku Photo Ind Co Ltd) 2 Dec. 1987.

*Patent Abstracts of Japan*, vol. 13, No. 479 (C–648) (3827) 30 Oct. 1989 & JP, A, 1 188 691 (Konica Corp).

*Primary Examiner*—John Niebling
*Assistant Examiner*—Brendan Mee
*Attorney, Agent, or Firm*—John R. Everett

[57] ABSTRACT

The present invention relates to an electrolytic desilvering method for photographic effluents.

This method is carried out in an electrolytic cell comprising at least one anodic compartment and at least one cathodic compartment. The photographic effluent is treated in the cathodic compartment of the cell in order to reduce the silver ions in solution. The electrolyte is then recycled in the anodic compartment before being discharged to the sewer.

This recycling in the anodic compartment allows to discharge to the sewer an effluent having a silver content less than 20 ppm.

9 Claims, 4 Drawing Sheets

ELECTROLYTIC DESILVERING METHOD

BACKGROUND OF THE INVENTION

1. Field of the Invention

The present invention relates to an electrolytic method which allows the desilvering of photographic effluents.

2. Description of the Prior Art

In the photographic development methods, silver ions are released in the processing baths, for example, in the fixing or bleach-fixing baths. The accumulation of these silver ions reduces the treatment efficiency. In order to compensate this degradation, a constant supply of fresh fixer is provided and the used fixing bath is discharged by overflow towards a rinsing tank, then goes down the drain. From an economical and ecological point of view, it is desirable to recover as much silver contained in these photographic effluents as possible, before discharging them in the sewer.

It is known to perform the desilvering of aqueous effluents by numerous processes such as, precipitation for example of $Ag_2S$, and oxidation-reduction, for example, on iron wool or by electrolysis.

In order to recover heavy metals such as silver, electrochemical reactions performed, for example, in cells with planar, fixed or mobile electrodes, with or without electrolyte circulation, cells with developed surface electrodes, volume cells, fixed bed or fluidized bed electrodes have been used since a long time. In these cells with [volume electrodes,] the electrolysis is performed by circulating the electrolyte through a conductive particle bed forming the cathode.

These electrodes known as porous electrodes, or volume electrodes, thus allow, due to their high specific surfaces, to treat diluted ionic solutions with a low electrolytic current density and thus to avoid unwanted reactions, particularly when the treated solution must be recycled.

European Patent 37 325 discloses such a device for recovering silver, the yield of which is improved by associating a radial or axial porous electrode to several counter electrodes.

The main drawback of this type of electrolysis is the rapid clogging up of the particle bed forming the volume porous electrode. This clogging up can be particularly rapid in the case of the treatment of some electrolytes, especially the silver ion solutions. In order to overcome this problem, electrolyses of this type were performed through fluidized particle beds in order to prevent the clogging up. However, the electrical conduction inside the bed is then performed under very bad conditions and the electrolytic current densities, much lower than in fixed bed, involve insufficient material transfers, which complicates the use of this method on an industrial scale.

European Patent 329 275 discloses the use of a volume cell which allows to recover the silver contained in photographic effluents ; the Ag content at the cell output is of the order of 100 ppm. This cell with a fluidized bed avoids the clogging up problems, without overcoming the electrical conduction problem. In this case, the silver ion content cannot be less than 100 ppm.

In order to overcome the cell clogging up while maintaining a good electrical conduction, French Patent 2 599 758 (WO 8 707 653) proposes an intermittently stirring of the electrolyte in the volume cells having a radial or colinear field, by pulsation in the electrolyte flow direction.

The silver discharge in the sewer being an environmental problem, it is likely that new more stringent regulations will appear. The prior art discharging, in the sewer, effluents having a silver concentration equal to or more than 100 ppm, it would be desirable to provide a desilvering method which would allow to obtain a silver content, after the desilvering treatment, much less than this value, by a method easy to carry out and economical, while avoiding the clogging up and bad conduction problems.

SUMMARY OF THE INVENTION

The present invention relates to an electrolytic desilvering method which allows to discharge in the sewer in one step a photographic effluent having a silver ion content less than 20 ppm (i.e., much lower than with the prior art methods).

This desilvering process is performed by circulating photographic effluents through an electrolytic cell wherein the electric field is perpendicular to the direction of circulation of the electrolyte, comprising at least one anodic compartment and one cathodic compartment, wherein the electrolyte is circulated in the cathodic compartment to recover silver by electrochemical reactions, characterized in that at least a part of the electrolyte leaving the cathodic compartment is recycled in the anodic compartment, before being discharged in the sewer. The electrolyte non-recycled part can be re-used in the photographic process.

The present invention can be carried out with a conventional electrolytic cell provided with ordinary means for recirculating solutions, the resulting improvement being connected to electrolysis phenomena and not to the cell structure.

DETAILED DESCRIPTION OF THE INVENTION

Without being bound by theoretical considerations, it was found that, during the electrolytic reaction, there was a difference of pH and concentration between the electrolyte contained in the cathodic and anodic compartments. Indeed, for example, a pH of 7 was observed in the cathodic compartment and of 4.5 in the anodic compartment. According to the invention, the circulation of the electrolyte in the anodic compartment before said electrolyte is discharged in the sewer, allows to obtain a pH close to 7 in this anodic compartment.

This pH increase in the anodic compartment, due to the electrolyte recirculation, involves the silver precipitation in the form of $Ag_2S$ silver sulfur in the anodic compartment (black coloring).

As the photographic effluents such as fixing or bleach-fixing baths contain an important amount of sulfur containing ions (sulfite, sulfate, thiosulfate). Generally, the electrolytic conditions for the silver reduction are determined in order to avoid electrochemical reactions with sulfur containing ions, which often disturb the electrolysis by precipitation of $Ag_2S$ at the cathode.

In the present invention, the silver sulfur precipitation, which is unexpectedly caused in the anodic compartment, is intentionally used in order to reduce, before the discharge to the sewer, the silver ion content as well as the sulfur content contained in the effluent. Its carrying out in the anodic compartment does not disturb the silver reduction at the cathode.

According to an embodiment, the electrolysis is performed through an electrolytic cell with a porous electrode. The use of this cell for recovering the silver contained in the photographic effluents was disclosed in European Patent 37 325 filed on Mar. 25, 1981 in the name of Eastman Kodak Company. The clogging up and poor conduction problems were solved by means of a cell having a percolated and pulsed porous electrode such as described in French patent 2 599 758. In the present invention, the stirring of the conductive particle bed can be permanently or intermittenly carried out by pulsation.

Figure 1:
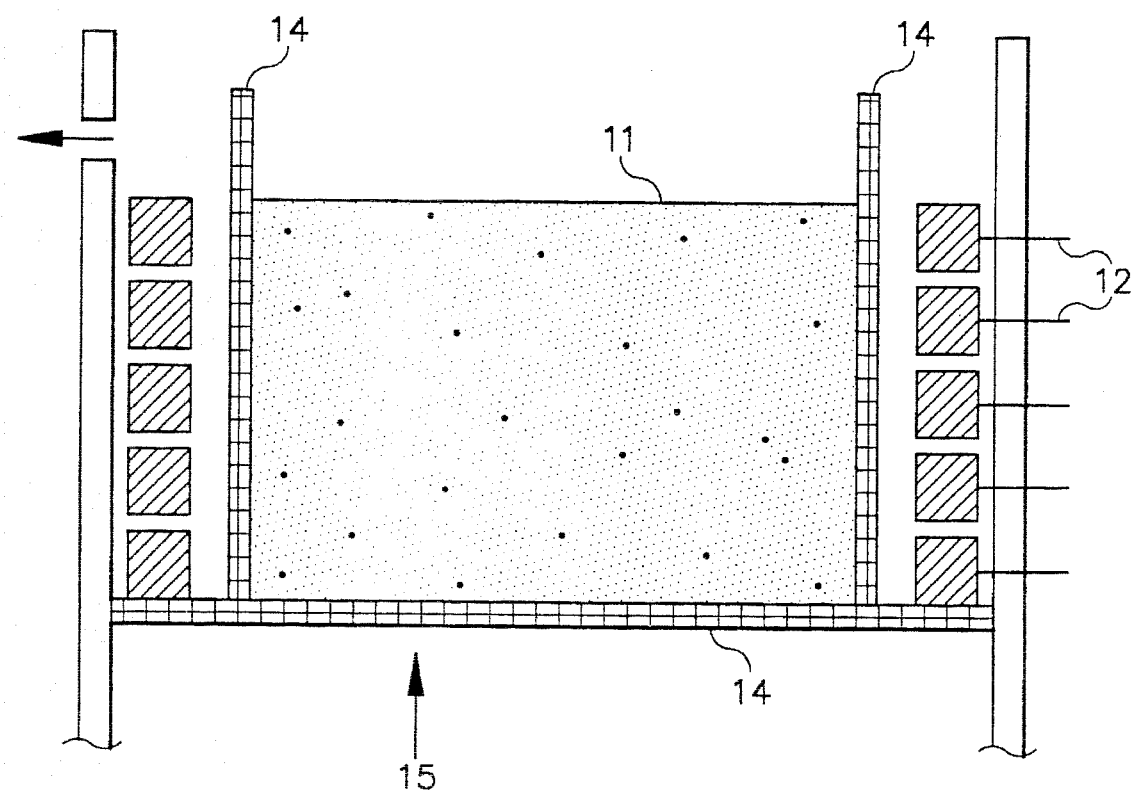
FIG. 1 illustrates a cross section view of an electrolytic cell having a perpendicular electric field.

FIG. 1 illustrates a cross section view of an electrolytic cell wherein the electric field is perpendicular to the direction of circulation of the electrolyte according to European Patent 37 325, comprising a porous separator (14), a central porous electrode (11) formed of conductive particles and a plurality of counter electrodes (12). The electric field inside the cell is perpendicular to the direction of circulation of the electrolyte (15).

In this particular embodiment of the present invention, the porous electrodes used are, in general, formed of particles or pellets exhibiting variable forms and dimensions, according to the electrochemical reaction considered. As it is desired to recover a metal by cathodic reduction, it is advantageous to use glass beads previously coated with a metallic silver deposit or metal beads. Silvered carbon particles can also be used. The particle diameter is chosen as a function of the cell dimensions. When the electrolytic cell works in a fixed bed, i.e. with a low percolation rate, it is preferable to choose large particles, for example, having a diameter ranging from 0.5 mm to 5 mm, and preferably from 2 to 3 mm. Particles exhibiting a smaller diameter can be used, but a rapid clogging up of the bed can occur.

The counter electrodes are conventionally manufactured. In the case where the particles are used as a cathode, the counter electrodes act as anodes. They are made of graphite, or metal. For example, graphite bars or cylinders, metal grids or platinum plated wires, according to the cell type can be used.

Generally, the electrodes are separated from the counter electrodes by a partition or a membrane allowing the ions to pass; this partition is, for example, constituted of porous alumina, or of a porous plastic material or of another material inert as regards to the electrochemical reactions occuring in the cell. The permeability of this partition or this membrane can be ion-selective. In some cases, an additional counter electrode is advantageously placed in a particular compartment, also isolated from the particle bed by a membrane exhibiting a selective permeability, or simply by a physical separator in order to avoid short-circuits between the anode and the cathode.

The control of the electrode potentials at the ends of the particle bed can be performed in a known manner by means of a potentiostat. The potentiostat provides a continuous voltage at the cell terminals and it keeps constant the voltage between two points of the cell, for example, between a reference electrode and a point in the particle bed close to the reference electrode. A "reference" potential, chosen on the intensity-potential curve of the electrochemical reaction considered, is displayed on the potentiostat and permanently compared to the potential-solution in the particle bed, such as measured by the reference electrode. According to the shift recorded between this potential and the reference potential, the potentiostat control device produces an anode potential variation which tends to compensate for this shift. The perturbations thus compensated can be the result of concentration, flow rate, temperature variations, etc.

According to an embodiment, the electrolyte which circulates through the porous electrode is submitted to a pulsation, so that the bed particles forming this electrode are fluidized during a fraction of each pulsation cycle. This pulsation method is disclosed in the French Patent Application 8608331.

It was evidenced that the advantages of the present invention were not due to a silver loss in the system, but that they were linked to electrochemical phenomena carried out during the recirculation, according to the present invention.

Figure 4:
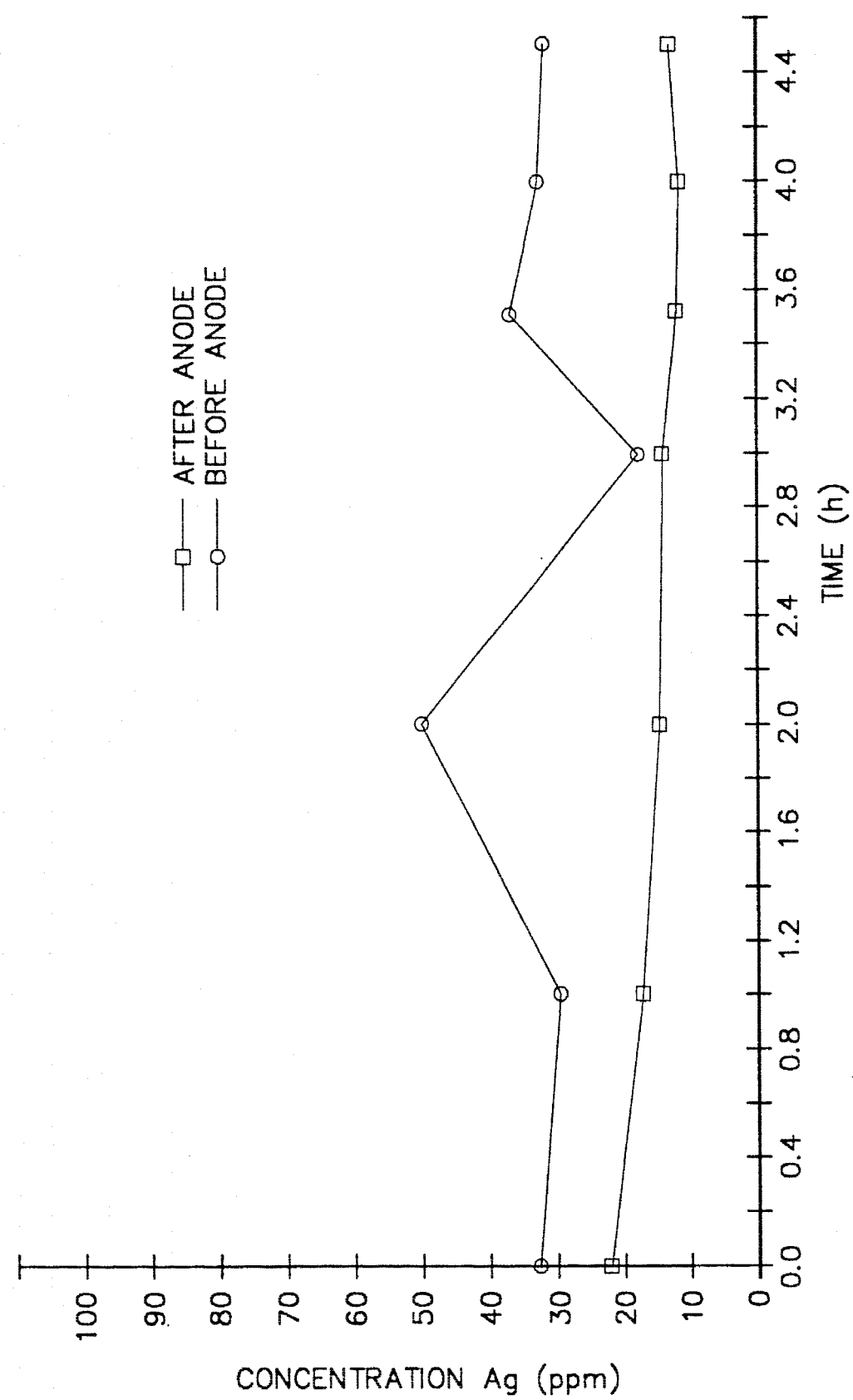
FIG. 4 shows the silver reduction by electrochemical method before and after the passage through the anodic compartment.

FIG. 4 shows the reduction of the silver content during recycling, by determining the silver amount at the input and the output of the anodic compartment.

Under the operating conditions and with silver contents corresponding to the treatment of photographic effluents directly at the output of a conventional high speed processing machine such as a processing machine for motion picture films, the cell according to the present invention allows, as shown by the following examples, to perform the electrolysis with a feeding flow rate of 8 l/h of the solution to treat containing 8 g/l of silver. This cell remains efficient for silver ion feeding flow rates as low as 50 ppm/h.

The operating conditions which are indicated in the following examples are directly in connection with the structure and the dimensions of the cell used. The determination of these operating conditions for an electrolytic cell exhibiting different dimensions can be performed without any particular difficulty for the one skilled in the art.

EXAMPLES

Figure 2:
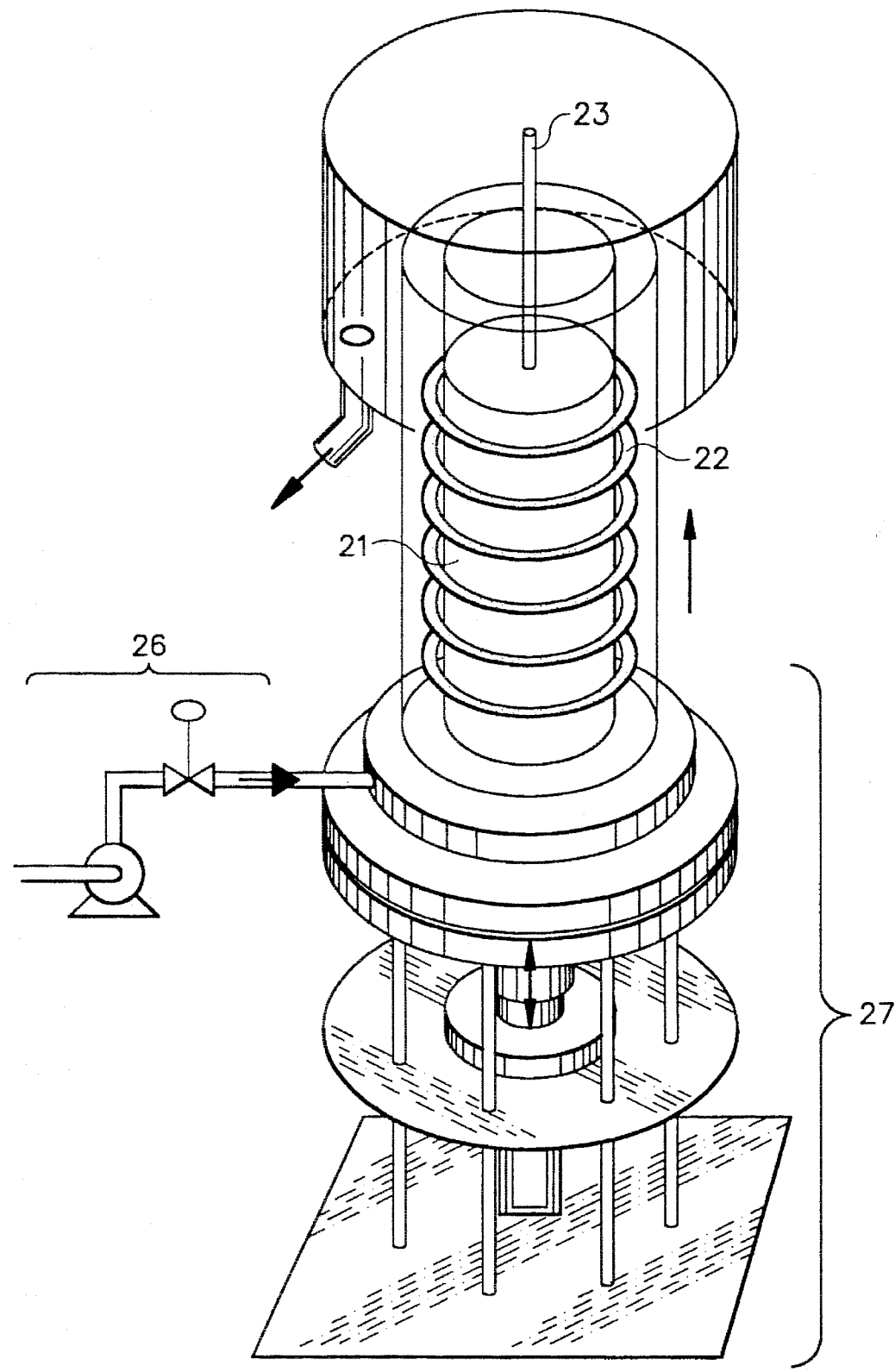
FIG. 2 is a schematic representation of the cell used in the present invention.

A pulsed porous volume electrochemical cell with a radial field such as illustrated in FIG. 2 was used. It was comprised of:

a cathodic compartment (21) formed of a porous cylinder (160 mm diameter, 200 mm height) containing carbon beads on which the deposit occured. The cathodic current supply was a mere central metallic rod (23).

an anodic compartment (22) enclosing the anode formed of an stainless grid (180 mm diameter) or of a series of ruthenium titanium crowns.

a feeding system (26) for the solution to treat completed by a homogenizing system. The feeding was produced by means of a peristaltic pump.

a pulsation system (27) with a double membrane driven by a piston, itself driven by a rod-crank system. It allowed, by operating a stirring of the particles, on the one hand to avoid their clogging-up and on the other hand to obtain a uniform coating.

The effluent to treat circulated in the cathodic compartment before being sent to the anodic compartment. This circulation was obtained by means of a turbine pump. The modification of the electrolyte flowrate allowed to control the percolation rate and the fluidization time.

The release of the photographic effluent after being passed through the anodic compartment was performed by overflow.

The current density passing through the cell was preferably from 100 to 500 A/m², and more preferably from 150 to 350 A/m² and the pulsation of the particle bed was from 1 s to 10 s. The recycling flowrate of the electrolyte in the anodic compartment depended on the dimensions of the cell used.

In the following examples, electrolysis was performed according to a preferred embodiment with the following operating parameters:

Current density: 310 A/m²

Pulsation: 5 s silver concentration in the used fixing bath: <8 l/h

Feeding flowrate: 8 l/h

Recycling flowrate in the anodic compartment: 1.45 m³/h

Samples before discharge in the sewer were regularly taken in order to control the silver content.

The experiments were made with a used fixing bath recovered at the output of a processing machine for motion picture films, which explains the initial Ag concentration differences.

COMPARATIVE EXAMPLE

The electrolytic cell (operating conditions described above) was fed with a photographic effluent containing 4.95 g/l of silver ion. The electrolyte was circulated only in the cathodic compartment, and then discharged to the sewer. Samples were taken every 30 minutes and the silver concentration was determined by an atomic absorption determination method (ICP: Inductively Coupled Plasma).

EXAMPLE 2 (Invention)

The same experiment was carried out with a photographic effluent containing 6.34 g/l of silver ion. At the output of the cathodic compartment, the electrolyte was recycled in the anodic compartment. Samples for analysis were taken at the output of the anodic compartment.

Figure 3:
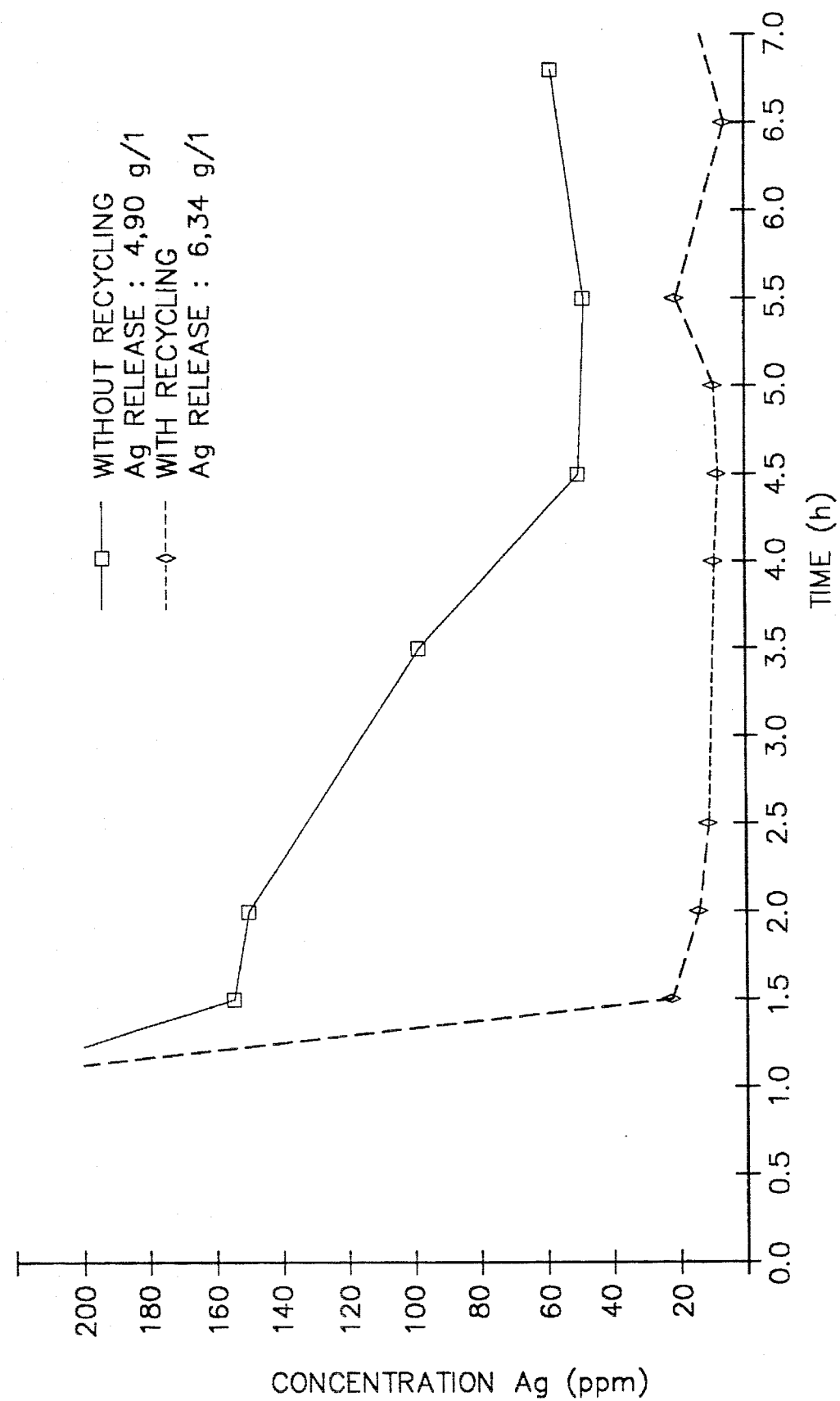
FIG. 3 shows the desilvering difference with and without recycling in the anodic compartment.

The data of examples 1 and 2 are illustrated on FIG. 3. After 1.5 h of operation, the silver content before release obtained by carrying out the present invention was 20 ppm, while in the absence of recycling, the silver content was more than 150 ppm.

After 4 hours of operation, the silver ion content obtained by carrying out the invention was 10 ppm while the silver content without recycling was more than 50 ppm.

In order to show the pH influence on the silver sulfur formation, the anodic compartment pH was modified during the recycling by injecting sulfuric acid. The electrolyte in the anodic compartment went down from a pH equal to 7 to an acid pH. Then, it was noticed that the black coloring, which is characteristic of the silver sulfur particles, disappeared in the anodic compartment.

EXAMPLE 3

The method of the present invention is carried out under the above mentioned operating conditions and with a photographic effluent containing 5.8 g/l of silver ions. Samples were taken every hour before and after the passage through the anodic compartment. FIG. 4 shows that there is a reduction of the silver content between these two points.

We claim:

1. A process for electrolytically desilvering a photographic effluent circulating through an electrolytic cell wherein said cell has an electric field that is perpendicular to the circulating effluent and comprises at least one anodic compartment and at least one cathodic compartment; said method comprising the steps of:

circulating the effluent through the cathodic compartment to desilver the effluent by electrochemical reaction;

circulating at least a portion of the desilvered effluent through the anodic compartment to form a mixture of the desilvered effluent with effluent in the anodic chamber, thereby forming silver sulfide;

and discharging the mixture formed in the anode chamber to a sewer.

2. A process according to claim 1, wherein the current density is in the range of from 100 to 500 A/m².

3. A process according to claim 2 wherein the current density is in the range of from 150 to 350 A/m².

4. A process according to claim 1 wherein the photographic effluent is a fixing bath.

5. A process according to claim 1 wherein the photographic effluent is a bleach-fixing bath.

6. A process according to claim 1 wherein the cell is feeded directly with the photographic effluent flowing out of a photographic processing machine.

7. A process according to claim 1 wherein the electrolyte non-recycled part can be reused in the photographic process.

8. A process according to claim 1 wherein the photographic effluent is percolated through a cathodically biased porous electrode.

9. A process according to claim 8 wherein the porous electrode is pulsed.

* * * * *